Oct. 21, 1958 H. F. LOETZ 2,857,177
PLURAL BALL AND SOCKET FLEXIBLE SEALED COUPLING FOR
HIGH TEMPERATURE GAS CONDUITS
Filed Dec. 29, 1954

INVENTOR.
Henry F. Loetz
BY Otto A. Earl
Attorney.

United States Patent Office 2,857,177
Patented Oct. 21, 1958

2,857,177

PLURAL BALL AND SOCKET FLEXIBLE SEALED COUPLING FOR HIGH TEMPERATURE GAS CONDUITS

Henry F. Loetz, Sturgis, Mich., assignor to Formed Tubes, Inc., Sturgis, Mich.

Application December 29, 1954, Serial No. 478,408

6 Claims. (Cl. 285—166)

This invention relates to improvements in flexible sealed coupling for high temperature gas conduits. The principle objects of this invention are:

First, to provide an inexpensive coupling that will permit limited universal movement between the ends of two pipes carrying hot gases.

Second, to provide a flexible coupling that retains a good gas tight seal in various adjusted positions and under varying height temperature conditions.

Third, to provide a coupling which may be assembled from parts manufactured within a fairly wide range of tolerances and without requiring expensive forming to close limits as to size and shape.

Fourth, to provide a coupling that is yieldably self supporting to absorb shocks and vibrations imparted to the coupling.

Other objects and advantages of the invention will be apparent from a consideration of the following description and claims. The drawings illustrate a highly practical form of the coupling.

Figure 1:
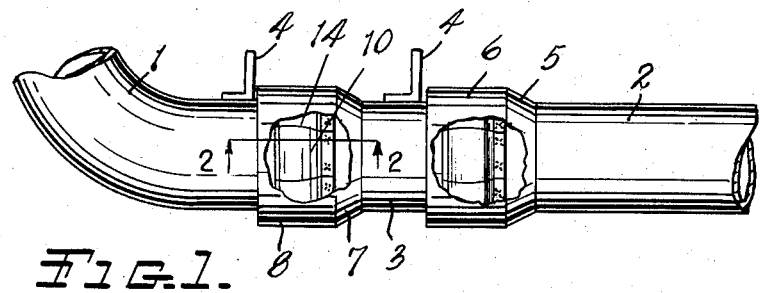
Fig. 1 is a fragmentary side elevational view of an exhaust pipe and tail pipe of an automotive engine with a coupling embodying the invention connecting the two pipes.
Figure 2:
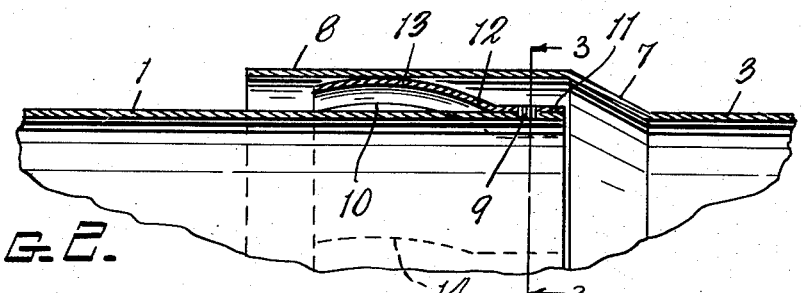
Fig. 2 is an enlarged fragmentary cross sectional view taken along the plane of the line 2—2 in Fig. 1.
Figure 3:
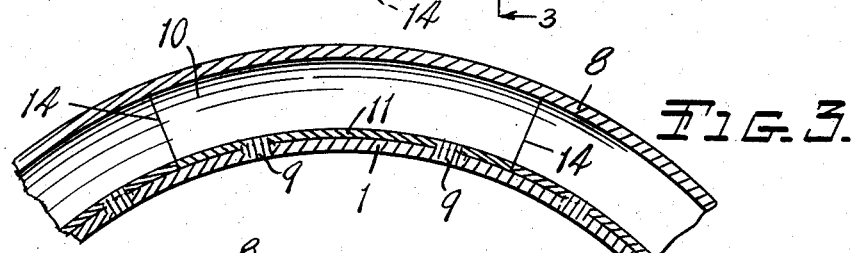
Fig. 3 is a fragmentary cross sectional view along the line 3—3 in Fig. 2.

The coupling is particularly adapted and illustrated for use in connection with the exhaust pipe and tail pipe of automotive vehicles but the invention is not limited to this specific use. The need for a flexible coupling in this connection is well established. In the example illustrated 1 indicates the exhaust pipe or manifold and 2 the tail pipe or muffler feed pipe. The coupling pipe 3 universally movably and sealingly connects the pipes 1 and 2. Stops 4 may be provided to limit axial sliding of the coupling pipe where desired.

The pipes 1, 2 and 3 all have the same minimum diameter as determined by the exhaust requirements of the engine with which they are to be associated but this is not essential where differences in cross sectional area of the exhaust conduit are permissable. When a constant size conduit is desired the end of the tail pipe has a tapered portion 5 terminating in an enlarged cylindrical end portion 6. The coupling pipe 3 has a similar tapered portion 7 and a cylindrical end portion 8. The end of the exhaust pipe fits in radially spaced relationship within the enlarged end of the coupling pipe and the small end of the coupling pipe fits in radially spaced relation within the enlarged end of the tail pipe.

Secured around the end of the exhaust pipe as by welding at 9 are a plurality of segmentally arranged leaves 10. The leaves 10 are made of heat resisting metal capable of retaining its resiliency at high temperatures. Inconel metal composed of 80% nickel, 8% chromium and 12% iron is satisfactory for the purpose. Each leaf has a narrow end portion 11 curved along a cylindrical surface to fit the outside of the exhaust pipe and desirably the end portions are of such a width as to completely surround the exhaust pipe with the edges of the leaves in side by side abutting engagement.

Figures 4, 5, 6:
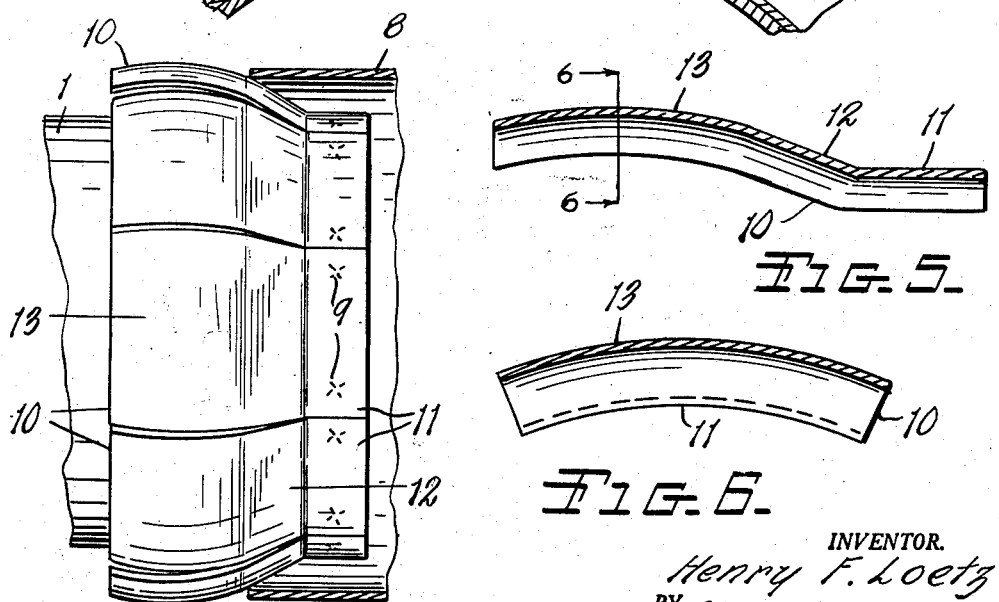
Fig. 4 is a fragmentary view, partially broken away showing part of the coupling in partially assembled condition.
Fig. 5 is a longitudinal cross sectional view through one of the flexible leaves of the coupling.
Fig. 6 is a cross sectional view along the line 6—6 in Fig. 5.

Inclined radially outwardly from the end portions 11 are tapered portions 12 formed as segments of a cone. The tapered portions 12 merge into dished or curved portions 13 formed as segments of a sphere. The side edges of the tapered portions 12 and the semi-spherical portions 13 are beveled or disposed along radii of from the central axis of the exhaust pipe so that the leaves will compress in tight sealed joints as at 14. The free uncompressed diameter of the semi-spherical portions 13 is larger than the inside diameter of the enlarged portion 8 of the coupling member as appears in Fig. 4.

As the enlarged end 8 of the coupling member is pressed over the outer ends of the leaves, the leaves are compressed or flexed radially inwardly. The joints 14 are thereby tightly closed and the leaves are placed under a flexing stress to hold the joints closed and to yieldably support the end of the exhaust pipe with respect to coupling pipe 3. The connection is capable of rotating and tilting motion between the two parts without breaking the gas tight seal between the two parts.

A similar joint or connection is provided between the small end of the coupling pipe 3 and the enlarged end 6 of the tail pipe with the leaves 10 secured around the small end of the coupling pipe as will be understood. The entire assembly provides two spaced universal joints so that the tail pipe can move relative to the exhaust pipe without breaking the gas tight connection between the pipes. The leaves 10 are easily formed as identical stampings for any given size of pipe and are automatically self locating when attached to the end of the pipe. The enlargements on the pipe sections, when used are easily formed by stamping or drawing.

Having thus described the invention what is claimed to be new and what is desired to be secured by Letters Patent is:

1. In combination with an exhaust pipe and tail pipe of an internal combustion engine a flexible coupling between said pipes comprising, an enlarged end having cylindrical walls on said tail, pipe, a coupling pipe having a small cylindrical end of the same diameter as the body of said tail pipe fitting within the enlarged end of the tail pipe and having an enlarged end of the same diameter as the enlarged end of the tail pipe fitting around the end of said exhaust pipe, an annularly arranged series of segmental leaves secured around the end of said exhaust pipe, said leaves being formed of heat resistant Inconel metal and having segmental-cylindrical ends welded to the exhaust pipe in side by side engagement and laterally tapered and outwardly inclined portions merging into segmental-spherical portions convexly arranged with respect to and in springable sealing engagement with the inside of the enlarged end of said coupling pipe, the side edges of said leaves being beveled and pressed into sealing engagement with each other, and a similar set of segmental leaves secured to the small end of said coupling pipe and sealingly engaged with the inside of the enlarged end of said tail pipe.

2. In combination with an exhaust pipe and tail pipe of an internal combustion engine a flexible coupling between said pipes comprising, an enlarged end having cylindrical walls on said tail pipe, a coupling pipe having a small cylindrical end fitting within the enlarged end of the tail pipe and having an enlarged end fitting around the end of said exhaust pipe, an annularly arranged series of segmental leaves secured around the end of said exhaust pipe, said leaves being formed of heat resistant Inconel metal and having segmental-cylindrical ends welded to the exhaust pipe in side by side engagement and laterally tapered and outwardly inclined portions merging into segmental-spherical portions convexly arranged with respect to and in springable sealing engagement with the niside of the enlarged end of said coupling pipe, the side edges of said leaves being beveled and pressed into sealing engagement with each other, and a similar set of segmental leaves secured to the small end of said coupling pipe and sealingly engaged with the inside of the enlarged end of said tail pipe.

3. In combination with an exhaust pipe and tail pipe of an internal combustion engine a flexible coupling between said pipes comprising, an enlarged end having cylindrical walls on said tail pipe, a coupling pipe having a small cylindrical end fitting within the enlarged end of the tail pipe and having an enlarged end fitting around the end of said exhaust pipe, an annularly arranged series of segmental leaves secured around the end of said exhaust pipe, said leaves being formed of heat resistant springable metal and having ends secured to the exhaust pipe in side by side relation and laterally tapered and outwardly inclined portions merging into curved portions convexly arranged with respect to and in springable sealing engagement with the inside of the enlarged end of said coupling pipe, the side edges of said leaves being beveled and pressed into sealing engagement with each other to form a seal between the pipes, and a similar set of segmental leaves secured to the small end of said coupling pipe and sealingly engaged with the inside of the enlarged end of said tail pipe.

4. In combination with an exhaust pipe and tail pipe of an internal combustion engine a flexible coupling between said pipes comprising, a coupling pipe having an end fitting within the end of the tail pipe and having an end fitting around the end of said exhaust pipe, an annularly arranged series of segmental leaves secured around the end of said exhaust pipe, said leaves being formed of heat resistant springable metal and having ends secured to the exhaust pipe in side by side relation and merging into curved portions convexly arranged with respect to and in springable sealing engagement with the inside of the end of said coupling pipe, the side edges of said leaves being beveled and pressed into sealing engagement with each other to form a seal between the pipes, and a similar set of segmental leaves secured to the end of said coupling pipe and sealingly engaged with the inside of the end of said tail pipe.

5. A flexible coupling between two pipes comprising, an enlarged end having cylindrical walls on one pipe, a coupling pipe having a small cylindrical end of the same diameter as the body of said one pipe fitting within the enlarged end of said one pipe and having an enlarged end of the same diameter as the enlarged end of said one pipe fitting around the end of the other of said pipes, an annularly arranged series of segmental leaves secured around the end of said other pipe, said leaves being formed of heat resistant springable metal and having ends secured to the other pipe in side by side relation and laterally tapered and outwardly inclined portions merging into semi-spherical portions convexly arranged with respect to and in springable sealing engagement with the inside of the enlarged end of said coupling pipe, the side edges of said leaves being beveled and pressed into sealing engagement with each other, and a similar set of segmental leaves secured to the small end of said coupling pipe and sealingly engaged with the inside of the enlarged end of said one pipe.

6. A resilient annular seal connection between two pipes of different diameters comprising, a plurality of segmental leaves having end portions curved along a cylindrical surface and secured around the end of the smaller pipe in side by side abutting engagement, tapered mid-portions in said leaves inclined radially outwardly from said end portions and merging with radially inwardly cupped portions formed as segments of a sphere, the side edges of said leaves being beveled to fit in abutting sealing engagement, the outer surfaces of said cupped portions being compressingly engaged completely around the inside of the larger of said pipes with the leaves yieldably deflected and stressed into abutting engagement between their side edges from the outer pipe to the inner pipe.

References Cited in the file of this patent

UNITED STATES PATENTS

| | | |
|---|---|---|
| 325,681 | Lindon | Sept. 8, 1885 |
| 1,255,577 | Berry | Feb. 5, 1918 |
| 2,085,922 | Moore | July 6, 1937 |
| 2,183,296 | Marx | Dec. 12, 1939 |
| 2,187,880 | Kaysing | Jan. 23, 1940 |
| 2,206,414 | Markey | July 2, 1940 |
| 2,369,849 | Phillips | Feb. 20, 1945 |
| 2,502,753 | Rohr | Apr. 4, 1950 |
| 2,565,737 | Morrison | Aug. 28, 1951 |
| 2,592,060 | Oulianoff | Apr. 8, 1952 |
| 2,672,359 | Fisher | Mar. 16, 1954 |
| 2,679,409 | Spender | May 25, 1954 |

FOREIGN PATENTS

| | | |
|---|---|---|
| 116,140 | France | Dec. 22, 1876 |
| 510,417 | France | Sept. 4, 1920 |